United States Patent [19]

Yahraus

[11] Patent Number: 4,636,072
[45] Date of Patent: Jan. 13, 1987

[54] METHOD AND APPARATUS FOR IMPROVED PHOTOMETRIC TESTING OF HIGH INTENSITY DISCHARGE LAMPS AND LUMINAIRES

[75] Inventor: Theodor G. Yahraus, Crawfordsville, Ind.

[73] Assignee: National Service Industries, Inc., Atlanta, Ga.

[21] Appl. No.: 529,376

[22] Filed: Sep. 6, 1983

[51] Int. Cl.$^4$ .................................................. G01J 1/02
[52] U.S. Cl. ...................... 356/121; 356/213; 356/230
[58] Field of Search ............... 356/213, 229, 230, 231, 356/232, 46–50, 215–217, 121; 313/111, 117, 231.71, 231.41, 578, 579, 25, 17, 8, 9, 316; 256/252.1

[56] References Cited

U.S. PATENT DOCUMENTS

| | | | |
|---|---|---|---|
| 2,392,305 | 1/1946 | Beese | 313/25 X |
| 2,478,399 | 8/1949 | Hunt | 356/230 |
| 3,377,467 | 4/1968 | Staunton et al. | 356/213 X |
| 3,502,890 | 3/1970 | Hedelman | 356/230 X |
| 3,522,464 | 8/1970 | Fougere | 356/230 X |
| 3,529,895 | 9/1970 | Pincus | 356/230 X |
| 4,015,158 | 3/1977 | Roller et al. | 313/25 |
| 4,023,910 | 5/1977 | Niederhauser et al. | 356/230 X |
| 4,029,983 | 6/1977 | Thornton | 313/25 |
| 4,256,988 | 3/1981 | Coaton et al. | 313/579 |
| 4,281,267 | 7/1981 | Johnson | 313/25 |
| 4,285,032 | 8/1981 | Honda et al. | 313/316 X |
| 4,305,015 | 12/1981 | Honda et al. | 313/117 X |
| 4,367,432 | 1/1983 | Glenny et al. | 313/25 X |

FOREIGN PATENT DOCUMENTS

| | | | |
|---|---|---|---|
| 0144647 | 11/1980 | Japan | 313/25 |
| 0122920 | 9/1981 | Japan | 356/213 |
| 2029638 | 3/1980 | United Kingdom | 313/117 |

Primary Examiner—R. A. Rosenberger
Attorney, Agent, or Firm—Emch, Schaffer, Schaub & Porcello

[57] ABSTRACT

An improved method and apparatus for use in photometric testing of high intensity discharge lamps and luminaires is disclosed. The improved apparatus includes the creation of a mock high intensity discharge lamp having an incandescent emitting element replacing the arc plasma of the subject high intensity discharge lamp while carefully duplicating all other structural and electrical details of the lamp. The improved method incorporates the use of the mock high intensity discharge lamp to obtain accurate testing of the photometric qualities of the regular high intensity discharge lamp.

2 Claims, 2 Drawing Figures

METHOD AND APPARATUS FOR IMPROVED PHOTOMETRIC TESTING OF HIGH INTENSITY DISCHARGE LAMPS AND LUMINAIRES

BACKGROUND OF THE INVENTION

The present invention relates to an improved method and apparatus for use in the photometric testing of high intensity discharge lamps and luminaires. Photometry, the measurement of light intensity, light energy and brightness relies upon a comparative analysis between the subject lamp or luminaire, and a "working standard" or test lamp having a published rated level of lumen output. Photometric measurements taken from various angular zones surrounding the subject lamp or luminaire are compared with the known lumen rating of the test lamp, thereby providing a quantitative analysis of the photometric qualities of the subject lamp or luminaire.

With the advent and widespread use of "relative photometry" it is no longer important that the lumen output of the test lamp actually duplicate its published lumen rating during testing. Since the test lamp is used as a radiant intensity emitter, it is known that the lamp will radiate in all directions in true proportion to its "normal" emission regardless of the level of its lumen output of wattage output. Therefore, as long as the test lamp in use has also been used to calibrate the sensor of the photometer, the actual candela values of luminous intensity can be pro-rated from the raw intensity readings taken during testing, in relative proportion to its published values. It is of critical importance, however, that the test lamp duplicate the structural and electrical details of the subject lamp or lamps intended for use with the subject luminaire within acceptable tolerances. Accurate duplication of all electrical and structural details is necessary to ensure that the radiant emission pattern of the test lamp remains in true proportion to the radiant emission pattern of the subject lamp.

The increased use and acceptance of high intensity discharge (HID) lamps, in varied commercial and industrial applications, has created numerous problems for photometric testing laboratories. Many of the problems being encountered by the laboratories are created by the very nature of the HID lamp. For instance, it is difficult to maintain a stable lumen output from an HID lamp during the test-taking period because a variety of factors, such as lamp orientation and changing environmental conditions can critically affect the stability of the arc stream. It is important to maintain the desired spacial orientation of an HID lamp during testing since the arc stream of the HID lamp tends to rise against gravity and can actually engage the walls of the arc tube if the lamp is oriented in an undesirable position. Further, it is desirable to maintain thermal equilibrium of the walls of the arc tube as variations in temperature along the surface of the arc tube will result in lumen instability. Such variations in thermal equilibrium are commonly caused by poor lamp orientation and instable environmental conditions. For instance, simply positioning an HID lamp in a drafty environment can cause critical instability in the lamp's lumen output.

Problems are also created for photometric testing laboratories by the excessive amounts of warm-up time, commonly 1-3 hours, needed to stabilize the lumen output of an HID lamp. Further problems are encountered in testing the photometric qualities of HID lamps and luminaires because of the need for heavy, expensive ballasting and other electrical control systems which HID lamps uniquely require for start-up and stable maintenance of lumen output. Yet other problems have been encountered when testing low output HID lamps. Such low output lamps create low sensor signal strength and the inherent electrical "noise" of the measurement equipment interferes with the ability to accurately measure the lamp's photometric qualities. In all, while HID lamps have many unique qualities which make them durable and desirable in many commercial and industrial applications, the photometric testing of such lamps and luminaires can often be a time consuming and frustrating chore in which many variables and inconsistencies affect the accuracy of the test results.

SUMMARY OF THE INVENTION

The present invention relates an apparatus and methodology for eliminating many of the problems encountered with HID lamp and luminaire testing, thereby improving the quality of the photometric test results. The apparatus of the present invention comprises the creation of a lamp having an incandescent emitting element with the exact geometric structure of the subject HID lamp. For the purposes of clarity within this specification, the incandescent duplicate of the subject HID lamp will be referred to as a "mock HID" lamp. The improved methodology of the present invention includes the use of the "mock HID" lamp, as a replacement for the subject HID lamp which it duplicates, during photometric testing, thereby eliminating many of the problems encountered when testing HID lamps.

The inherent qualities of incandescent systems, such as exceptionally short warm-up times, easy stabilization of lumen output, and less sensitivity to changes is spacial orientation and thermal equilibrium offer a solution to testing problems encountered due to the troublesome nature of HID lamps. Further, incandescent lamps need very little burn-in time to stabilize the lumen output of new lamps and therby provide more lumen stability more rapidly than their HID counterparts. Also, incandescent lamps have no need for the heavy expensive ballasting and complex electrical systems which are required to start and stabilize the lumen output of an HID lamp.

The present invention relates an apparatus and methodology for the photometric testing of HID lamps and their luminaires wherein the "working standard" electric lamp is an incandescent mock HID lamp having a candela distribution which is proportional in behavior to its HID equivalent. To obtain the proportionality, the meaningful structural details of the subject HID lamp as well as its arc length, size, and diffusing power are faithfully simulated in the mock HID. In the present invention, the ionized arc stream contained within the arc tube of the HID lamp is replaced by an incandescent filament. Preferably, the incandescent filament is placed within the arc tube of the subject HID lamp to create the mock HID lamp. If it is impractical to use the actual arc tube of the subject HID lamp, a closely sized alternative envelope is used which is composed of an appropriate substitute material having transmission and diffusivity qualities which are closely compared to the actual HID arc tube. The replacement envelope or arc tube of the mock HID lamp can be frosted, if desired, to better approximate the intensity behavior of the actual ionized arc stream. Thus, it can be seen that the use of such an incandescent mock HID lamp as the "working standard" in testing HID lamps and luminaires solves many problems which have plagued the photometric testing industry.

It can also be appreciated that the invention may also be utilized in many applications other than lamp and luminaire testing. For instance, the provision of a mock HID lamp for use in sales, promotional and educational demonstrations of HID luminaire optics systems would be highly beneficial. However, for the purposes of describing the preferred embodiment of the method and apparatus of the invention, such description will be made with reference to the photometric testing of HID luminaires.

It is an object of this invention to improve the apparatus and methodology for the photometric testing of HID lamps and luminaires.

Another object of this invention is to eliminate the excessive warm-up times needed to stabilize the lumen output of HID lamps undergoing testing.

Yet another object of this invention is to enhance lamp lumen stability during the test taking period and reduce the lamp sensitivity to orientation and drafts.

Yet another object of the invention is to simplify the electrical control systems required to start and maintain the test lamps.

Yet another of the invention is to reduce the burn-in time required to season new test lamps.

DETAILED DESCRIPTION OF THE PREFERRED EMBODIMENT

Figures 1, 2:
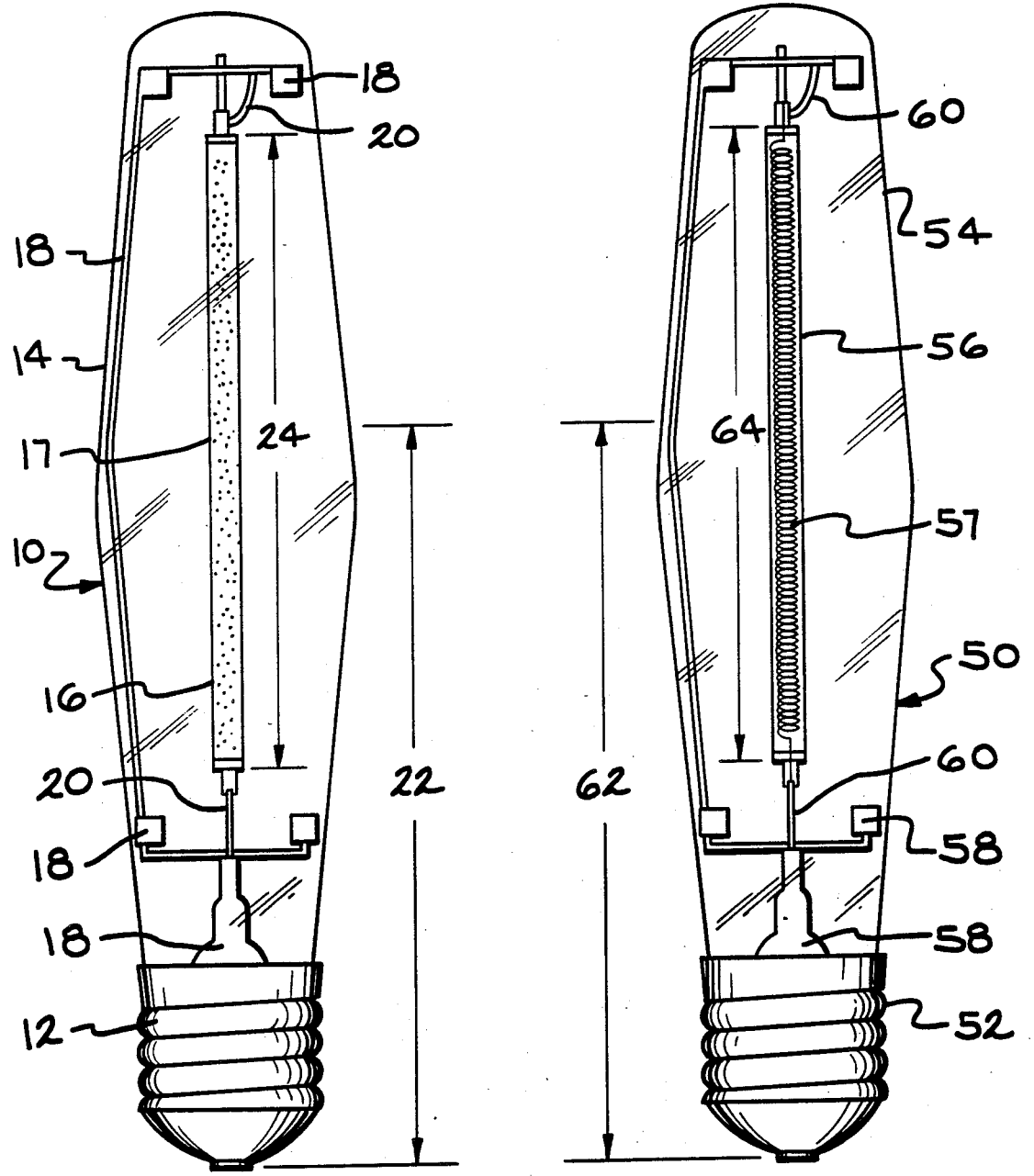
FIG. 1 shows a typical HID lamp.
FIG. 2 shows the mock HID simulated lamp having an incandescent filament replacing the ionized arc stream.

The preferred embodiment of the apparatus of this invention involves the creation of an incandescent lamp which closely simulates an HID lamp which is the subject of photometric testing. Preferably the incandescent system will utilize a tungsten-halogen cycle, which has many characteristics desirable to the accuracy and repeatability of photometric testing. While the inherent characteristics of incandescent lamps make them logical substitutes for HID lamps, it has been found that tungsten-halogen incandescent lamps offer the greatest advantages. The advantages of the tungsten-halogen cycle allow the incandescent system to maintain its initial light output throughout a greater portion of the life of the lamp. Also, the tungsten-halogen lamp generally will not blacken and the bulb remains clear until burn-out of the lamp.

The major requirement for preparing an accurate incandescent model of an HID lamp is the accurate duplication of the meaningful structural details and dimensions of the subject HID lamp. Accurate duplication is critical to simulate the affects of structural shadowing, etc., in the lumen output of the subject HID lamp. Further it is important to duplicate the arc length of the HID lamp with the incandescent system and create an emitting element which closely reproduces the diffusivity and intensity proportions of the subject HID lamp. Referring now to FIG. 1 a typical HID lamp 10 is shown. The meaningful elements of the HID lamp 10 which must be duplicated by the incandescent "mock" HID are the base 12, envelope 14, arc tube 16, arc tube support structure 18, and electrical connections 20. The geometry of the light center length 22 and arc length 24 must also be duplicated.

The preferred embodiment of the mock HID 50 having an incandescent system is shown in FIG. 2. The base 52 of the mock HID lamp 50 simulates the base 12 of the subject lamp HID 10. The envelope 54 of the mock HID lamp 50 simulates, in shape and size, the envelope 14 of the subject HID lamp 10. The internal envelope 56 which contains the tungsten halogen incandescent cycle 57 simulates in shape and size, the arc tube 16 containing the arc plasma 17 of the subject HID lamp 10. To duplicate the light emission quality of the ion stream of the subject HID lamp 10 as closely as possible, the internal envelope 56 of the mock HID lamp 50 may be frosted, or may be constructed out of polycrystaline aluminium oxide or a substitute material of suitable transmission diffusivity. The structural supports 58 for the internal envelope 56 of the mock HID lamp 50 duplicate the geometric structure of the arc tube supports 18 of the subject HID lamp 10. Further the geometric configurations of the electrical connections 60 of the mock HID lamp 50 duplicate the electrical connections 20 of the subject HID lamp 10. Of course, the light center length 62 of the mock HID lamp 50 must duplicate the light center length 22 of the subject HID lamp 10 and the internal envelope length 64 of the mock HID lamp 50 should duplicate the arc tube length 24 of the subject HID lamp 10 to provide accuracy in the relative photometric testing.

The preferred embodiment of the present invention involves the utilization of the actual physical structure of the subject HID lamp 10 to create the mock HID lamp 50, thereby ensuring the accurate reproduction of the vital structural details. To ensure accurate duplication of the electrical details, it is preferable to utilize the arc tube 16 of the subject HID lamp 10 as the internal envelope 56 for the tungsten-halogen cycle of the mock HID lamp 50. If it is impractical to use the arc tube 16 of the subject HID lamp 10 as the internal envelope 56 for the mock HID lamp 50, the closest sized alternative must be used. If an alternative envelope is necessary, it is preferable to use an internal envelope 56 composed of polycrystaline aluminium oxide of a substitute material having transmission and diffusivity qualities comparable to the original arc tube 16. Other internal envelopes may be created which have a frosted quartz jacket or phosphor covered jacket to better simulate the arc stream radiance of the original arc tube 16. It may even be preferable, in preparation of certain mock HID lamps, to utilize very narrow fluorescent tubes and other gas fills in replacement of the tungsten halogen cycle to achieve the necessary simulation of light transmission and diffusivity. The spirit of the present invention is to duplicate and reproduce as closely as possible the electrical and structural characteristics of the subject HID lamp in an incandescent system or, if desired, a fluorescent system for the purposes of easing testing methodologies and eliminating the hardships caused by undesirable HID characteristics.

The improved methodology for testing the photometric qualities of luminaires intended for use with high intensity discharge lamps requires the following steps:

Upon selection of the HID lamp having characteristics desirable for use with a given luminaire, a mock HID duplicate of the subject HID lamp is constructed by replacing the ionized arc stream of the subject HID lamp with an incandescent emitting element, such as the tungsten halogen cycle, and duplicating the remaining structural and electrical detail of the subject HID lamp. The mock HID lamp is placed into the specified spacial orientation the the subject HID will encounter when used with the luminaire. The candlepower of the mock HID lamp is measured throughout several standard test angle zones located on a sphere of predetermined radius surrounding the light center of the mock HID lamp. For instance, the candlepower readings are taken at the midpoints of the standard test angle zones and are taken in verticle planes which lie parallel to the longitudinal axis of a vertically oriented lamp. If the mock HID lamp is oriented in a horizontal mode, the candlepower readings will be taken in vertical places which lie perpendicular to the longitudinal axis of the lamp. The candlepower measurements are repeated at dissimiliar locations within each of the test angle zones and averaged to obtain a proportional candlepower value for each test angle zone. The average candlepower value for each test angle zone is multiplied by the published zonal constant for the particular test angle zone to obtain the proportional lumen output of each test zone. The proportional lumen output values for each of the longitudinal test angle zone are then totaled to provide a total proportional lumen output for the mock HID lamp having the incandescent emitter.

The proportional lumen output of the mock HID lamp is directly comparable to the published lumen output of the subject HID lamp and, since the structural and electrical integrity of the subject HID lamp has been carefully simulated by the mock HID lamp, their relative proportionality is unchanging. Therefore a proportionality constant is obtained by dividing the published rated lumen value for the subject HID lamp by the total proportional lumen output of the mock HID lamp having the incandescent insert. The individual proportional photometric qualities of the mock HID lamp having the incandescent emitting element, when multiplied by the proportionality constant, will then provide the relative photometric qualities of the actual subject HID lamp, as used in the luminaire.

Variations of the preferred embodiment of this invention may be desirable depending upon the specific needs of the photometric tests. Such variations are intended to lie within the spirit of this invention, without limitation.

What is claimed is:

1. An improved method for testing the photometric qualities of luminaires intended for use with a high intensity discharge lamp having a tube enclosing an ionized arc stream, comprising:

(a) selecting a high intensity discharge lamp having an arc tube enclosing an ionized arc stream, said high intensity discharge lamp having a published total lamp lumen rating;

(b) replacing such arc tube with an accurately constructed copy of such arc tube which replaces such ionized arc stream with an incandescent filament while maintaining all other structural and electrial components of said lamp;

(c) measuring the proportional candlepower of said lamp having said incandescent filament, said measurements occuring at the midpoints of standard test angle zones surrounding the light center of said lamp;

(d) repeating such proportional candlepower measurements at dissimilar locations within each of said test angle zones to obtain an average proportional candlepower value for each of said test angle zones;

(e) obtaining the proportional lumen output for each of said test angle zones by multiplying said average proportional candlepower value of each of said test angle zones by a predetermined zonal multiplier for said test angle zones and totalling said proportional lumen output values for said test angle zones, thereby providing a total proportional lumen output for said lamp having said incandescent filament;

(f) obtaining a proportionality constant for said lamp having said incandescent filament by dividing the published rated lumen value for said high intensity discharge lamp by said total proportional lumen output of said lamp having said incandescent filament; and, (g) using said proportionality constant to obtain the relative photometric qualities of said actual high intensity discharge lamp as used in a subject luminaire from said proportional photometric qualities of said lamp having said incandescent filament.

2. The improved method of claim 1 including placing said lamp having said incandescent filament in the exact spacial orientation, when testing said subject luminaire, that said lamp was placed in while obtaining said proportionality constant.

* * * * *